United States Patent [19]

Dumay et al.

[11] Patent Number: 4,713,214

[45] Date of Patent: Dec. 15, 1987

[54] DEVICE FOR PURIFYING LIQUID METAL COOLANT FOR A FAST NEUTRON NUCLEAR REACTOR

[75] Inventors: Jean-Jacques Dumay, Dampierre; Claude Malaval, Antony, both of France

[73] Assignee: Novatome, Le Plessis Robinson, France

[21] Appl. No.: 541,749

[22] Filed: Oct. 13, 1983

[30] Foreign Application Priority Data

Oct. 29, 1982 [FR] France .............................. 82 18195

[51] Int. Cl.$^4$ ............................................. G21C 19/30
[52] U.S. Cl. ................................... 376/312; 376/291; 376/313
[58] Field of Search ........................ 210/176, 774, 775; 376/289, 290, 291, 292, 308, 310, 312, 313, 399, 403

[56] References Cited

U.S. PATENT DOCUMENTS

| | | | |
|---|---|---|---|
| 2,585,244 | 2/1952 | Hanson | 210/176 |
| 3,552,485 | 1/1971 | Jannou | 376/312 |
| 3,693,959 | 9/1972 | Swinhoe et al. | 210/774 |
| 3,962,082 | 6/1976 | Hundal | 376/312 |
| 4,278,499 | 7/1981 | Abramson et al. | 376/312 |

FOREIGN PATENT DOCUMENTS

| | | |
|---|---|---|
| 2246942 | 5/1975 | France . |
| 2412915 | 8/1979 | France .............................. 376/312 |
| 24006 | 7/1978 | Japan .............................. 376/312 |

OTHER PUBLICATIONS

McGuire et al., "Control of Tritium in Liquid-Metal Cooled Fast Breeder Reoc.", Atomic Energy Review, 1978, pp. 657-695.
Murase et al., "Impurity Deposition in a Mesh-Packed Cold Trap", Nuclear Technology, vol. 48, pp. 196-203, May 1980.

*Primary Examiner*—Deborah L. Kyle
*Assistant Examiner*—Richard L. Klein
*Attorney, Agent, or Firm*—Pollock, Vande Sande & Priddy

[57] ABSTRACT

Device for purifying liquid metal coolant for a fast neutron nuclear reactor, comprising a pump (6) for circulating the liquid metal, the metal then being purified and heated after purification, as well as a filter (24) of metallic fibers. It consists of an assembly of annular chambers with a vertical axis, closed at their lower part by a base plate (10) and defined and separated from each other by an assembly of coaxial cylindrical metallic shells. The device comprises, from the exterior inwards, a degassing chamber (12), a chamber enclosing an economizer-exchanger (14, 16), a thermal insulation wall (18), a cooling chamber (20) and a purifying chamber (22) in the central part of which is a filter cartridge (24). In the central part of the cartridge (24) is a channel (25) for collecting the purified liquid metal in communication with a basin (44) for collecting the purified liquid metal rising above the device. The invention applies, in particular, to fast neutron nuclear reactors of an integrated type, cooled with liquid sodium.

13 Claims, 14 Drawing Figures

DEVICE FOR PURIFYING LIQUID METAL COOLANT FOR A FAST NEUTRON NUCLEAR REACTOR

FIELD OF THE INVENTION

The invention relates to a device for purifying liquid metal coolant for a fast neutron nuclear reactor.

BACKGROUND OF THE INVENTION

Fast neutron nuclear reactors generally employ a liquid metal such as sodium as a heat transfer fluid. During the operation of the reactor, this liquid sodium, which circulates in the vessel in contact with the core and with the various parts of the internal equipment of the reactor vessel, becomes laden with impurities such as oxides and hydrides, which are dissolved in the sodium, or such as solid particles in suspension.

It is therefore necessary to purify the liquid metal heat transfer fluid during the use of the reactor.

In general, use is made of complex devices permitting a part of the liquid sodium to be withdrawn, cooled and passed through a filter consisting of metallic fibers, for example of stainless steel. The impurities retained by the liquid metal precipitate preferentially on the metallic fibers of the filter if the temperature of the liquid metal is sufficiently low. In this way a cold trapping of the impurities is carried out.

Such devices permitting the cold trapping of the impurities comprise a pump for circulating the liquid metal, an economizer exchanger permitting the heat transfer between the hot unpurified metal and the cold purified metal to be ensured, a device for additional cooling of the liquid metal to be purified and a filter cartridge of metallic fibers.

Such devices can be submerged in the reaction vessel, these devices being then called integrated, or alternatively mounted outside the vessel in a secondary liquid metal loop, and these devices are then called secondary.

Such devices have been described, for example, in French Pat. Nos. 2,246,942 and 2,395,570. These devices have a complex structure in which the various elements of which they are composed are placed above each other in the axial direction of the device. The length of these assemblies is therefore relatively great and, when they are arranged vertically inside the vessel of a fast neutron nuclear reactor, their robustness with regard to external constraints, for example during an earthquake, can prove to be inadequate. These assemblies comprise numerous runs of pipework connecting their various parts.

In the case of the device described in U.S. Pat. No. 2,246,942, the filter cartridge forms a mechanical assembly comprising a central tube for circulating the sodium and a sodium overflow in its upper part.

The device described in U.S. Pat. No. 2,395,570 comprises an extremely complex sodium loop having many tubular linking components.

In the case of both devices, the coil for cooling the sodium which is to be purified is moreover incorporated in the device so that its disassembly is difficult to carry out and so that it is contaminated by the sodium which is to be purified coming from the vessel containing the reactor core.

In the event of a leak in this cooling coil, its disassembly is difficult and requires a complete decontamination operation.

The known devices of the prior art are therefore complex in their structure; this increases the costs of manufacturing and maintaining these devices which have, furthermore, a great length, numerous sections of pipework interconnecting the parts and, as a result, a resistance to external stresses, such as those due to earthquakes, which can be inadequate. These devices are also subjected to constraints of a thermal origin which can be considerable and which require the provision of connecting pipework of a special shape (lyre).

SUMMARY OF THE INVENTION

The object of the invention is therefore to offer a device for purifying the liquid metal coolant of a fast neutron nuclear reactor by cold trapping of the impurities comprising a pump for the circulation of the liquid metal, means of cooling the liquid metal to be purified and means for heating the purified liquid metal, comprising in particular an economizer exchanger ensuring a heat transfer between the unpurified metal and the purified metal, as well as a filter of metallic fibers for the deposition of the impurities, a device which has a simple and robust structure facilitating the design, the construction and the maintenance of the device and improving its resistance to stress of a mechanical or thermal origin.

To this end, the purifying device consists of an assembly of annular chambers with a vertical axis, closed at their lower part by at least one horizontal base plate ensuring the mechanical robustness and the fixing of the assembly, the chambers being defined and separated from each other by an assembly of coaxial cylindrical metallic shells, the device comprising, from the exterior inwards:

a chamber for degassing the purified metal, which is open in its upper part, a chamber enclosing the economizer exchanger in which the part receiving the hot unpurified liquid metal is in communication at the lower part of the chamber of the economizer exchanger with the exit of the pump for circulating the liquid metal and in which the part receiving the purified liquid metal is in communication also at the lower part of the chamber of the economizer exchanger with the lower part of the degassing chamber and with a duct for discharging the purified metal, an annular thermal insulation wall which is coaxial with the chambers, a cooling chamber filled with purified liquid metal and connected to the means of cooling, a chamber for cooling and purifying the liquid metal communicating through its upper part with the part of the economizer exchanger where the cooled unpurified metal circulates and, through its internal lateral wall, with the external lateral surface of an annular filter cartridge which is coaxial with the chambers, a central channel for collecting the purified liquid metal, directed along the axis of the filter cartridge in communication through its upper end with a basin for collecting the purified liquid metal rising above the device, bounded externally by the internal cylindrical shell of the degassing chamber and in communication with the part of the economizer exchanger through which the purified liquid metal enters.

BRIEF DESCRIPTION OF THE DRAWINGS

In order that the invention may be more clearly understood, a description will now be given by way of non-limiting examples, of several embodiments of devices for purifying the liquid metal coolant of a fast neutron nuclear reactor.

DETAILED DESCRIPTION

Figure 1:
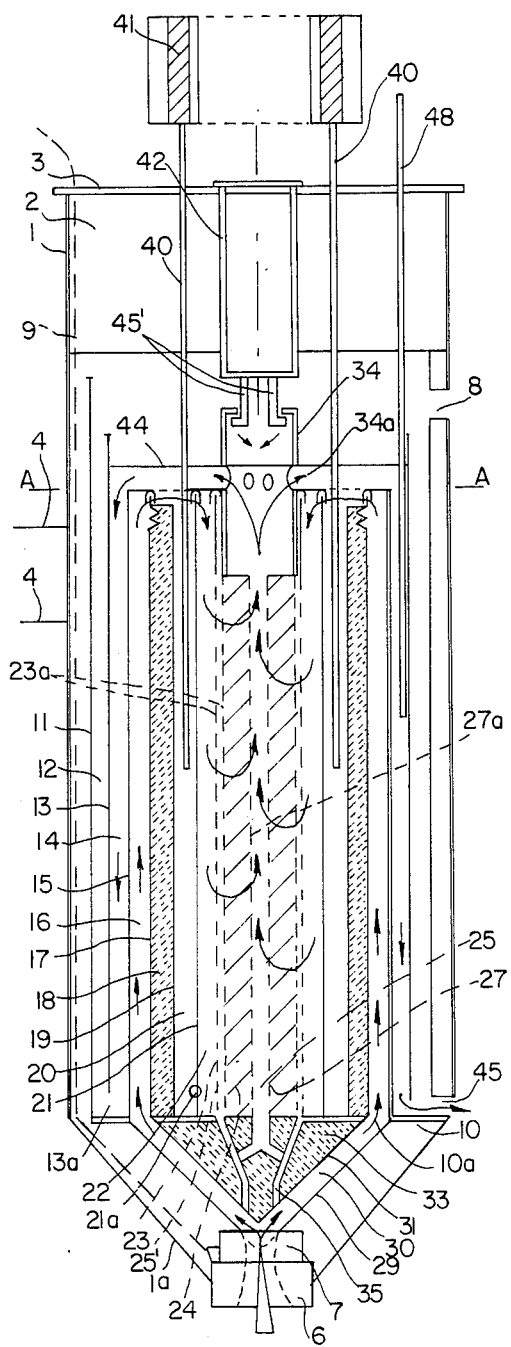
FIG. 1 shows, in a view in a cross-section through a vertical plane of symmetry, a purifying device according to the invention, of the integrated type, comprising an economizer exchanger according to a first embodiment.
Figure 1B:
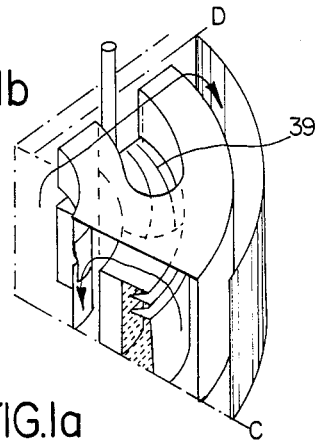
FIG. 1b shows a view in perspective of a part of the upper part of the purifying device in the region of an outlet of a cooling device.
Figure 1A:
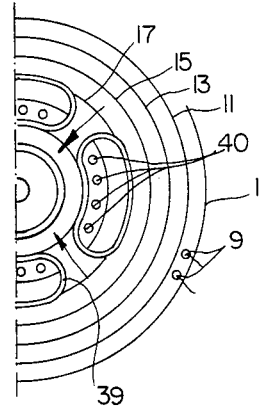
FIG. 1a shows a half-view in cross-section along line A—A of FIG. 1.

FIGS. 1, 1a and 1b show a purifying device of the integrated type comprising an outer casing 1 joined in its upper part to a plug 2 whose upper flange 3 rests on the slab closing the reactor vessel when the device is introduced into the vessel through a hole passing through the slab whose thickness corresponds essentially to the thickness of the plug 2. The lower part of the casing 1 enclosing the purification device as such then enters under the level 4 of the liquid sodium filling the vessel. In actual fact, the level 4 can move between the maximum level 4a and the minimum level 4b. The casing 1 has a lower, frustoconical part 1a surrounding the lower part of the purifying device. This part of the purifying device comprises a flow-metering pump 6–7 which is responsible for pumping the sodium to be purified in the reactor vessel and for controlling the flow-rate of the sodium pumped in the vessel. Such a flow-metering pump unit for liquid metal, without pipe connections, manufactured by NOVATOME, enables the manufacture of the lower part of the purifying device to be simplified.

The casing 1 is filled with an inert gas, for example argon, and communicates with the argon blanketing the vessel through an opening 8 in the upper part. Through the argon-filled casing 1 pass the cables 9 for supplying and for collecting the signal from the flow-metering pump 6–7.

The purifying device as such, arranged inside the casing 1 comprises a base plate 10 on which are fixed the various shells forming the casings of the coaxial annular chambers of the purifying device. The base plate 10 is fixed to the casing 1 at its periphery in the region of the joint of the frustoconical part 1a.

The successive shells form both the outer wall of a chamber and the inner wall of the adjacent chamber. All these shells are coaxial and are arranged vertically. The first two shells 11 and 13 define a first annular chamber 12 which communicates through the intermediary of cut-outs 13a in the shell 13, above the base plate 10, with the following chamber 14 defined by the shells 13 and 15.

The following annular chamber 16 defined by the shells 15 and 17 communicates through the holes 10a arranged in the plate 10 with the device for supplying liquid metal to be purified which will be described later.

The first annular chamber 12 has its upper part open, opening out into the atmosphere of argon filling the casing 1.

The shells 17 and 19 provide an annular space 18 filled with a refractory material permitting the thermal insulation of the outer peripheral part of the purifying device from the inner part.

The first annular chamber 20 of the inner part of the purifying device is defined by the shells 19 and 21, whilst the following chamber 22 is defined by the shell 21 and by a shell 23 which has a set of openings 23a in its lateral surface. These openings 23a enable the chamber 22 to communicate, through the intermediary of its inner lateral surface 23, with the outer lateral surface 25, also pierced with openings, of a filter cartridge 24 made of stainless steel fibers.

The filter cartridge 24 is defined in its inner part by a shell 27 pierced with openings 27a and defining a channel 25 in the central part of the purifying device, following the vertical axis of the latter.

The means for supplying the purifying device with liquid metal to be purified comprise, apart from the flowmetering pump 6–7, a supply chamber 30 defined by the frustoconical shells 29 and 31 and communicating with the holes 10a in the base plate 10.

Inside the shell 31 there is arranged a heatinsulating component 33 having in its inner part a plug 35 pierced with openings permitting the draining of the liquid metal filling the purifying device when the filter cartridge 24 is raised.

The shell 27 defining the central channel 25 is joined in its upper part to a shell 34 comprising openings 34a and fixed rigidly to the filter cartridge 24.

The shell 13 has its upper edge free and forms the outer casing of a basin for collecting the purified liquid metal, into which the openings 34a come out.

Referring to FIGS. 1 and 1a to 1d, a description will now be given of the upper part of the purifying device, showing the way in which the various shells forming the successive chambers are joined. These various shells are all arranged inside the shell 13 which forms the outer casing of the basin for collecting the purified fluid.

The shells 15, 17, 21 and 23 which define, respectively, the chambers 14 and 22 are fixed in their upper part to an annular horizontal plate 37, whilst the shells 17, 19 and 21 are joined to a horizontal annular plate 38 at a level below the level of the plate 37.

The plate 37 is pierced with bean-shaped openings whose cross-section can be seen in FIG. 1a. At the level of these openings 37a, the plate 38 is pierced with openings 38a whose cross-section corresponds to the cross-section of the openings 37a which are cut by the edge of the shell 19. Four shafts 39 are arranged in the region of these openings and are fixed to the shells 17 and 21 and to the plates 37 and 38. These shafts 39 allow access from above to the annular chamber 20 in which are immersed heat pipes 40 which are joined by their upper part to an external heat exchanger 41.

Between the shafts 39, the horizontal plates 37 and 38 define a passage for the liquid metal from the annular chamber 16 to the annular chamber 22.

The plug of the purifying device supports with its central part the plug for lifting the filter cartridge 42. This plug carries, in its lower part, lifting bars 45' which can engage with the inner part of the shell 34 for the lifting of the filter cartridge and for its disassembly.

The shell 17 comprises an upper part 17b which forms a bellows permitting the lengthwise expansion of this shell.

We shall now describe the operation of the purifying device shown in FIG. 1 and in FIGS. 1a to 1d.

The liquid sodium is drawn into the vessel by the pump 6 whose flowrate is measured by the flowmeter 7 of the flow-metering pump assembly, and this liquid sodium to be purified passes into the entry chamber 30 between the frustoconical shells. This sodium to be purified then passes into the annular chamber 16 through the holes 10a in the base plate 10. The hot sodium to be purified passes through the chamber 16 upwards as far as its upper part, where it flows into the interior of the annular cooling and purifying chamber 22.

The annular chamber 20 is filled with the purified liquid sodium in which are immersed the heat pipes 40. The sodium to be purified entering the chamber 22 through its upper end comes, therefore, into thermal contact through the intermediary of the shell 21 with the sodium which is cooled by the heat pipes 40. This cooled sodium then passes through the openings 23a provided in the lateral surface of the shell 23 and the filter cartridge 24 in contact with the metallic fibers from which the impurities solidify and are separated from the liquid sodium which arrives purified in the collecting channel 25 which communicates by its upper part with the shell 34, itself communicating by the openings 34a with the collecting basin 44 for the purified liquid sodium. This basin for purified liquid communicates at its periphery with the annular chamber 14 in which the purified sodium moves downwards in contact with the outer surface of the shell 15 whose inner surface is in contact with the hot liquid metal to be purified traversing the annular chamber 16 upwards. The adjacent chambers 14 and 16 form, in this embodiment, the economizer exchanger permitting the reheating of the purified sodium and the cooling of the sodium to be purified before its entry into the chamber 22 where an additional cooling of the liquid sodium is produced in contact with the shell 21 cooled by the sodium filling the chamber 20.

The lower part of the chamber 14 communicates through the openings 13a of the shell 13 with the degassing chamber 12, so that the gas bubbles which may be present in the purified sodium rise in the chamber 12 and are removed into the gas blanket filling the casing 1.

The lower part of the shells 13, 11 and of the casing 1 also comprise openings providing at least one duct 45 for discharging the purified metal for its recirculation into the reactor vessel.

The figures show with arrows the direction of flow of the sodium inside the entire purifying device.

The inner shell 21 of the cooling chamber 20 has, in its lower part, a very small opening 21a allowing the draining of the purified sodium filling the annular cooling chamber 20, for example for the maintenance of the purifying device or when it is dismantled.

This very small opening for draining 21a does not allow a flow of purified sodium from the basin 44 towards the chamber 22 at a significant flowrate. The purified sodium filling the cooling chamber is therefore practically stationary.

Figure 1C:
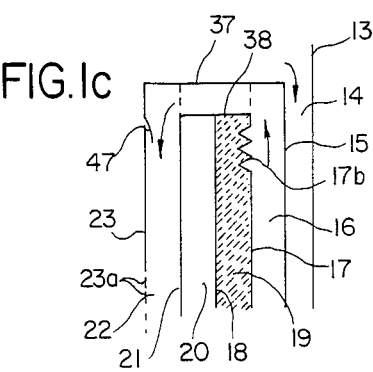
FIG. 1c shows a cross-section along line C of FIG. 1b.
Figure 1D:
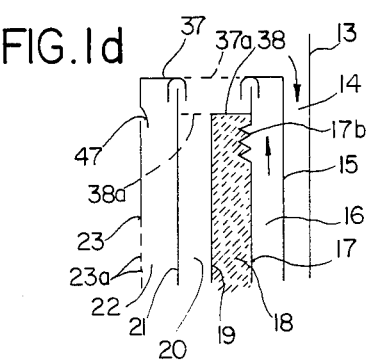
FIG. 1d shows a cross-section along line D of FIG. 1b.

As can be seen in FIG. 1d, the joints between the plates 37 and 38, the shells 17 and 21 and the shafts 39 are not perfectly leakproof and allow some relative movement of the shells and plates. However, this sealing is sufficient to prevent the entry of unpurified sodium inside the cooling chamber 20. This chamber therefore always contains sodium which is stationary and free from impurities.

A probe 48 which is immersed in the collecting basin 44 and in the chamber 14 makes it possible to control the level of the purified metal in the basin 44. The information from this level probe is employed to regulate the throughput of the pump 6 measured by the flow meter 7.

The heat pipes 40 are connected by their upper part to a heat exchanger 41 arranged above the slab. This exchanger is of the air-cooled or water-cooled type.

The part of the purifying device which is arranged inside the thermal insulation wall 18 receives only cooled sodium, since the sodium to be purified entering the upper part of the purification chamber 22 has circulated along the entire height of the chamber 16 in contact with the cooled purified sodium circulating downwards in the exit chamber 14, the adjacent annular chambers 14 and 16 forming the economizer exchanger of the purifying device.

In the same way, the chamber 20 contains sodium which is cooled to an even lower temperature by the heat pipes 40.

On the other hand, the part of the purifying device which is arranged outside the thermal insulation wall 18 receives hot sodium which circulates, for example, in the chamber 16 coming from the vessel and in the lower part of the exit chamber 14 of the degassing chamber 12, the purified sodium having been reheated in the economizer exchanger in contact with the hot sodium circulating in the chamber 16. The purified sodium comes out again through the duct 45 at a temperature which is close to the sodium coming from the vessel and entering the entry chamber 30.

The structure shown in FIG. 1 permits a free expansion of all the shells which are fixed to the base plate 10 by one of their ends. This is also the case for conical shells defining the entry chamber 30, and cylindrical shells defining the various annular chambers of the purifying device.

It is seen, in fact, in FIG. 1b that the plates 37 and 38 arranged in the upper part of the cylindrical shells are mounted on the latter through the intermediary of a connection allowing axial movements due to the expansion. The outer shell 17 of the thermal insulation wall 18 in contact with the hot sodium in the chamber 16 has, in its upper part, a bellows 17b which makes it possible to absorb the relative movements in the axial direction of the plate 38 and the shell 17. This is the only expansion bellows which is required in the entire purifying device.

The plate 37 which is connected rigidly to the shell 15 comprises a closure collar 47 which can be seen in FIGS. 1c and 1d, permitting it to be joined to the shell 23 with an adequate leaktightness, whilst permitting the relative axial movements of this shell and of the plate 37.

Figure 2:
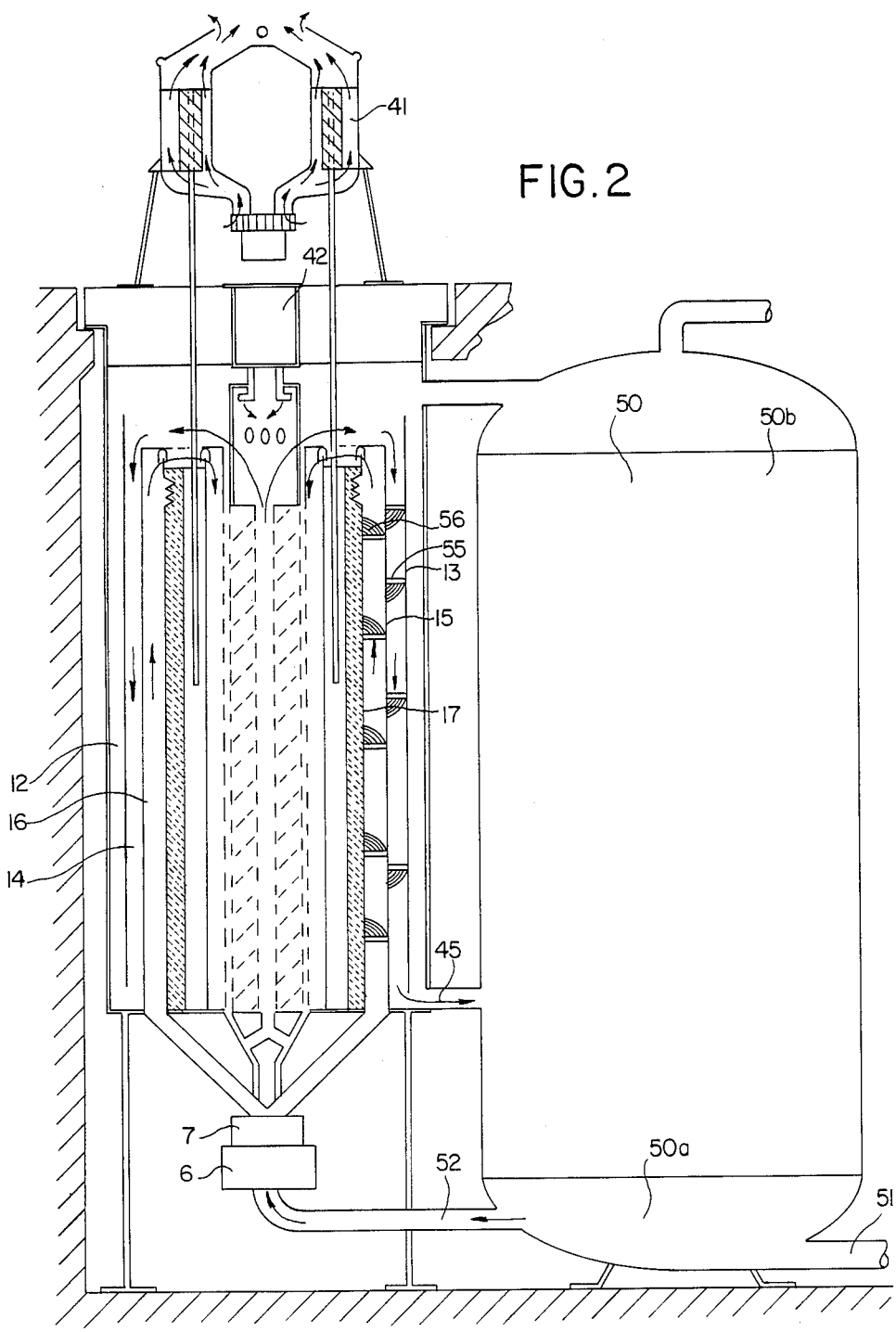
FIG. 2 shows, in a view in cross-section through a vertical plane of symmetry, a purifying device according to the invention, of the secondary type, comprising an economizer exchanger according to a second embodiment.

In FIG. 2 can be seen a purifying device which is practically identical to the device shown in FIG. 1 and is placed in parallel with a reservoir 50 receiving the sodium to be purified into its lower part 50a through a duct 51 and receiving the purified sodium in return into its part 50b.

A complete description of the purifying device will not be repeated, its components, which are identical to those already described with reference to FIG. 1, being indicated by the same references.

In contrast to the device described with reference to FIG. 1, the device of FIG. 2 does not have an external casing 1 and receives the sodium to be purified through a duct 52 connected to the pump 6. The duct 45 leads back to the part 50b of the reservoir 50.

The economizer exchanger formed by the chambers 14 and 16 moreover contains baffles 55 and 56 arranged helically on the shells 15 and 17, respectively, inside chambers 14 and 16 respectively.

These helices serve as stiffeners for the shells of the economizer exchanger and force the hot sodium and the cold sodium to follow a helical path inside the economizer exchanger, eliminating the interference flows of liquid sodium which oppose the heat exchanges.

In fact, it is necessary to have annular spaces 14 and 16 of a very small thickness, of the order of a centimeter, in order to promote the heat exchanges. Similarly, the intermediate shell 15 of the economizer exchanger should be of a low thickness of the order of 2 mm. The heat calculations show, on the other hand, that in the case of fast neutron nuclear reactors, the annular spaces can be of a very great height, of the order of 4 to 5 meters. It is therefore necessary to use stiffeners for the shells forming the economizer exchanger and to avoid the interference flows of the liquid sodium due to thermal siphons, which are harmful to the heat exchanges.

In the case of the embodiment shown in FIG. 1, the annular spaces 14 and 16 of the economizer exchanger are divided into vertical channels by metal sheets which serve both as deflectors and stiffeners.

In the embodiment described in FIG. 2, the circulation of the sodium can be improved further by arranging deflectors 55 and 56 helically inside the two annular spaces of the economizer exchanger. This improvement is produced at the expense of a slight complexity of the construction of the purifying device.

Figure 3:
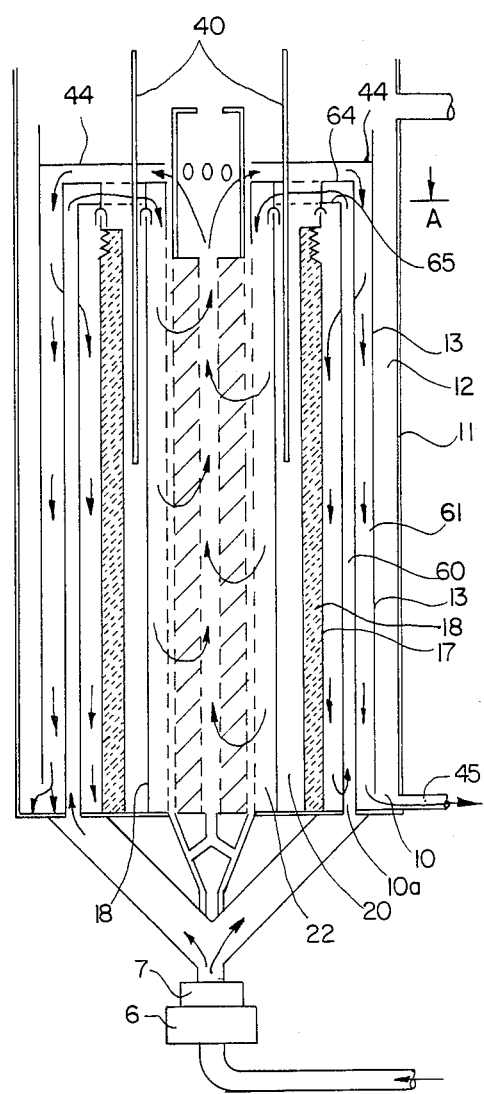
FIG. 3 shows, in a view in cross-section through a vertical plane of symmetry, a purifying device according to the invention comprising an economizer exchanger according to a third embodiment.
Figure 3A:
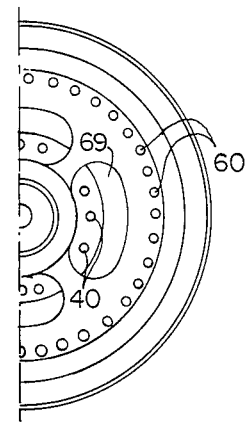
FIG. 3a is a half-view in cross-section along line A of FIG. 3.

FIGS. 3 and 3a show a purifying device which is wholly comparable to the device shown in FIG. 1 with regard to its part which is arranged within the thermal insulation wall 18 receiving the cold sodium, but whose economizer exchanger is produced in a different way. This economizer exchanger comprises a set of tubes 60 which are fixed at their lower part on the base plate 10 at the level of the orifices 10a, the plate 10 serving as a lower tube plate for the economizer exchanger. At their upper part, they come out into a space which is defined by two horizontal plates 64 and 65 permitting the sodium to be purified to be collected and directed towards the cooling and purifying chamber 22.

The metal sheets 64 and 65 are pierced according to the openings permitting the heat pipes 40 to enter the cooling chamber 20 through the shafts 69 passing through the openings in the plates 64 and 65.

The tubes 60 are immersed, inside a chamber 61 defined by the shells 13 and 17, in the cooled purified sodium flowing from the collecting basin 44 through the annular chamber 61. The degassing of the purified liquid sodium and its discharge from the purifying device are carried out in a manner which is identical to that for the device shown in FIG. 1, the annular chamber 61 being joined by its lower part to the degassing chamber 12 and to the duct 45 for discharging the purified sodium.

Figure 4A:
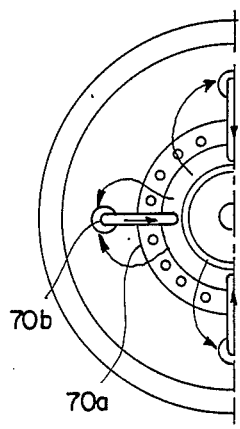
FIG. 4a is a half-view in cross-section along line A of FIG. 4.
Figure 4:
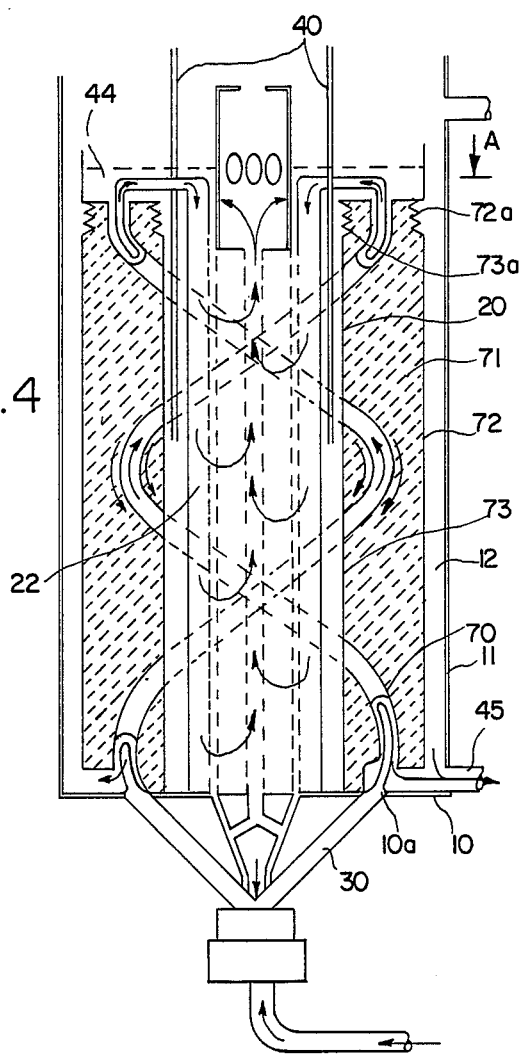
FIG. 4 is a view, in a cross-section through a vertical plane of symmetry, of a purifying device comprising an economizer exchanger according to a fourth embodiment.

FIGS. 4 and 4a show a purifying device whose inner part receiving the cooled sodium is identical to the corresponding part of the device shown in FIG. 1 and whose economizer exchanger differs in shape. This economizer exchanger consists of a set of double coaxial tubes 70 arranged along a helical path inside a very thick thermal insulation wall 71. This thermal insulation wall 71 is defined by shells 72 and 73 comprising bellows 72a and 73a in their upper part.

The inner tube of each of the double coaxial tubes communicates at its lower part, through the intermediary of orifices 10a of the base plate 10, with the space 30 by which the hot liquid sodium to be purified arrives. The external coaxial tube communicates, at its lower part, with the lower part of the degassing chamber 12 and with the duct for discharging the purified sodium 45.

As can be seen in FIGS. 4 and 4a, the upper part of the internal coaxial tube communicates with the cooling and purifying chamber 22 at its upper part. The upper part of the outer coaxial tube communicates with the basin 44 for collecting the purified liquid sodium. In this way, the hot liquid sodium to be purified circulates upwards following a helical path in the inner tubes 70a and downwards following a helical path in the outer tubes 70b. As in the embodiments described earlier, the heat exchanges take place countercurrentwise.

Figure 5:
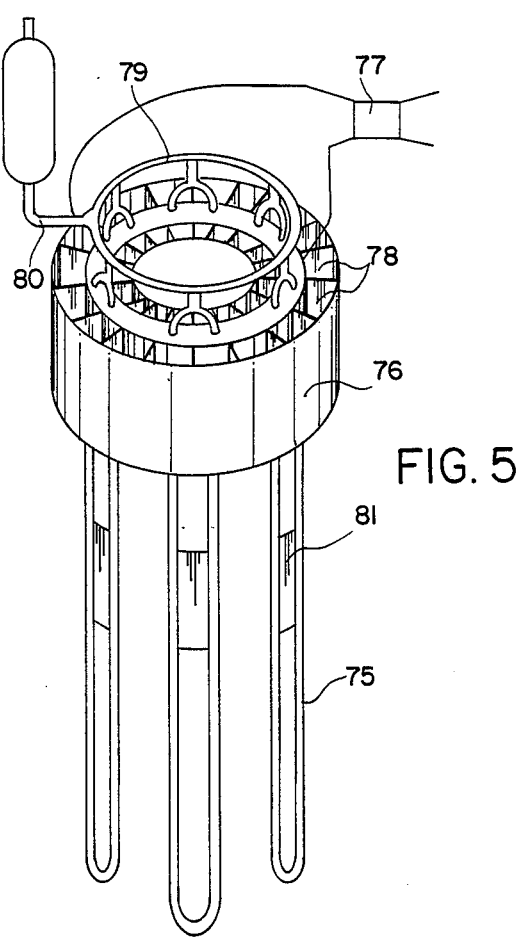
FIG. 5 is a view in perspective of a device for external cooling of a purifying device according to the invention.

FIG. 5 shows an external cooling device which can replace the heat pipes 40 and the device 41 described with reference to FIG. 1. Such a cooling device comprises hairpin tubes 75 whose lower part can be introduced into the cooling chamber 20 of a purifying device such as shown in FIGS. 1, 2 and 3.

These tubes are introduced into the chamber 20 through the shafts 39. At their upper part they pass through an exchanger 76 of the sodium-air type, the cooling air being blown inside the cooling channels 78 by a blower 77. The upper loop of the hairpins 75 is connected to a toric duct 79, itself communicating with an expansion vessel 80. A packing 81 permits the tubes 75 to be placed inside an opening provided in the plug of the purifying device. The sodium circulates by thermal siphoning inside the tubes 75, releasing its heat in the exchanger 76.

Figure 6A:
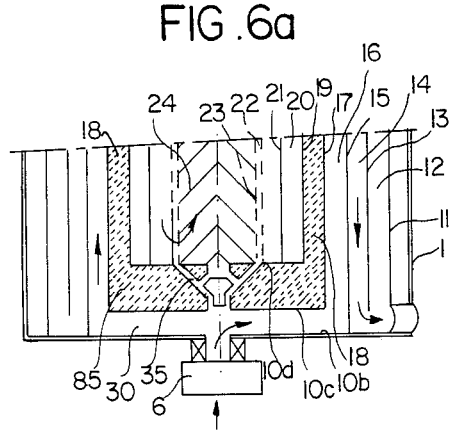
FIG. 6a is a view in cross-section of the lower part of a purifying device showing a first alternative form of producing the lower part of the chambers and of the means of pumping connected to the inlet of the economizer exchanger.

FIG. 6a shows an alternative way of producing the lower part of the annular chambers of the purifying device such as shown, for example, in FIG. 1.

In this embodiment, the successive coaxial shells are joined to a base plate 10b of the housing 1 and the shells 11, 13 and 15 to a base plate 10c of the shell 17 and to a base plate 10d of the shells 19, 21 and 23. The feed chamber 30 is defined by the plates 10b and 10c and a thick thermal insulation component 85 is arranged between the base plates 10c and 10d, at the lower part of the insulating wall 18. The electromagnetic pump 6 is thus arranged immediately below the base plate 10b. The plug 35 is arranged inside the massive insulation component 85, underneath the filter cartridge 24. The massive insulation component 85 completely separates thermally the part of the device containing hot sodium from the part of the device containing cooled sodium.

Figure 6B:
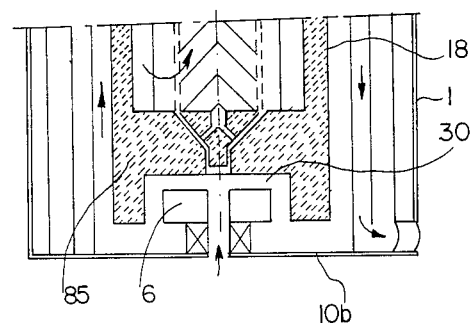
FIG. 6b is a view in cross-section through a vertical plane of symmetry of the lower part of a purifying device according to the invention, showing a second alternative form of producing the lower part of the chambers and of the means of pumping connected to the inlet of the economizer exchanger.

FIG. 6b shows a second alternative way of producing the lower part of the purifying device, where the electromagnetic pump 6 and the entry chamber 30 for the hot sodium to be purified have been arranged inside the very thick thermal insulation component 85 above the plate 10b. This arrangement is particularly advantageous because the whole of the device is inside the enclosure defined by the casing 1 and by the plate 10b.

The arrangements shown in FIGS. 6a and 6b have the advantage of ensuring the closure of all the chambers containing hot sodium by one and the same base plate and the closure of all the lower parts of the chambers containing the cold sodium by another base plate.

In this way, the differential expansions which lead to deformations of the base plate are avoided.

Figure 7:
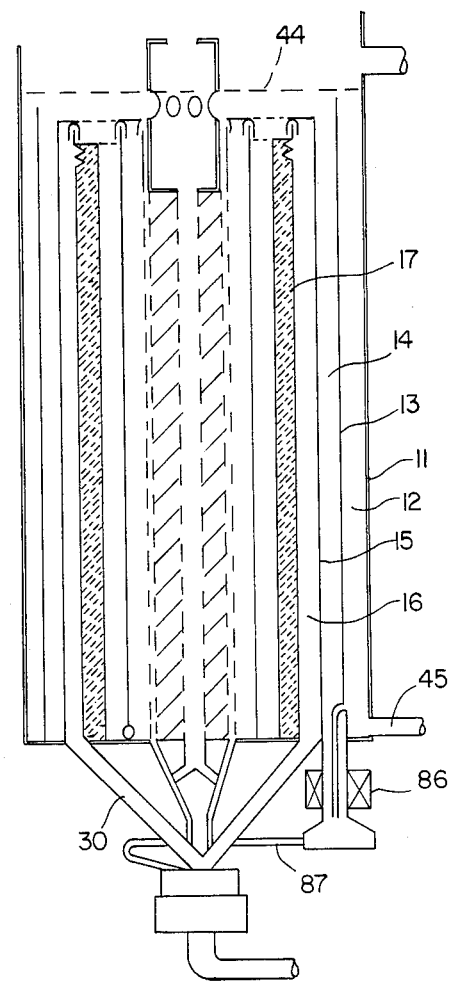
FIG. 7 shows, in a view in cross-section through a vertical plane of symmetry, a purifying device similar to the device shown in FIG. 1 and comprising an additional means of pumping for the regulation of the liquid metal level in the basin for collecting the purified metal.

The purifying device shown in FIG. 7 is identical in every respect to the purifying device shown in FIG. 1 but comprises additionally an electromagnetic regulating pump 86 which is interposed between the annular chambers 12 and 14 and connected to their lower part.

Such a regulating pump propelling their liquid sodium from the annular chamber 12 towards the annular chamber 14 permits the free level in the basin for collecting the purified sodium to be raised until the time when this level exceeds the upper level of the shell 13. The purified liquid sodium then overflows directly into the annular chamber 12 where its degassing and then its discharge through the duct 45 take place without a passage through the economizer exchanger formed by the annular chambers 14 and 16. Cooling of the hot metal is thus avoided, which can be advantageous in the case of an integrated purification in a nuclear reactor during the handling of the fuel or of the components of this reactor. In fact, during such handling, the sodium in the vessel is at a fairly low temperature (180° C.).

The regulating pump is connected to the entry chamber 30 by a small diameter pipe 87 permitting drainage.

It is seen that the main advantages of the device according to the invention are that it can be produced in a practically identical manner whether it is of the integrated or secondary type, that its construction is particularly simple and that, in particular, the cartridge contains no mechanical part nor any internal pipework. This cartridge can therefore be easily removed and discarded, should this be necessary. The whole module is arranged on a base plate serving as support for the module and permitting the fixing of the shells which are thus free to expand on one side of the base plate. This results low thermal stresses.

Furthermore, the annular construction permits having a device which is shorter than the devices of the prior art and which stands up better to earthquakes. This construction is particularly compact and its cross-section is identical over virtually the whole of its length.

The cooling being ensured by heat pipes or by hairpin heat exchange tubes immersed in a cooling chamber, which are easily removable, the maintenance and the repair of this part of the device are particularly easy and require no complex decontaminating operations.

Finally, such a purifying device is of a simple construction comprising no internal connecting pipework, the liquid metal moving only inside annular chambers which communicate with each other at one of their ends.

The invention is not limited to the embodiments which have just been described; on the contrary, it comprises all variants thereof.

It is thus possible to imagine other ways of producing the economizer exchanger and the external cooling device.

It is also possible to imagine the use of other types of filtering devices in the central part of the purifying device. It is possible, for example, to imagine the use of perforated sheets or gridwork or an alternation of perforated sheets and metallic filter cloths.

The device according to the invention can be employed for the purification of any liquid metal coolant of a fast neutron nuclear reactor. This device can be employed as an integrated device or as a secondary device.

We claim:

1. In a fast neutron nuclear reactor cooled by a liquid metal and comprising a vessel containing said liquid metal coolant and a support structure, a device of purifying the liquid metal coolant comprising
   (a) an external cylindrical envelope fixed to the support structure;
   (b) an assembly of annular and coaxial chambers separated by cylindrical casings disposed vertically inside said cylindrical envelope;
   (c) a pump connected to said assembly of chambers and disposed with respect to said vessel for circulating the liquid metal through said chambers;
   (d) a filter cartridge disposed at the central part of said assembly of chambers;
   (e) a channel disposed at the central part of said filter cartridge for collecting the purified liquid metal;
   (f) an economizer exchanger contained in a first chamber of said assembly of chambers connected to said pump to receive liquid metal to be purified and to said channel to receive purified liquid metal;
   (g) cooling means connected to a second chamber for cooling the liquid metal before its purification by passage through the filter wherein said chambers are all disposed one inside the other, their casings being fixed at their lower parts, on one horizontal plate supported by said external envelope, such that they are freely expandable independent of each other, said assembly of chambers comprising from said external envelope inwards;
a chamber for degassing the purified metal open in its upper part, bounding externally by its external wall a basin for collecting the purified metal placed at the upper part of the device;
said first chamber enclosing the economizer exchanger communicating with the lower part of said degassing chamber through its part receiving the purified liquid metal and with a duct for discharging the purified liquid metal;

said second chamber connected to said cooling means and filled with purified liquid metal;

a chamber containing the filter in communication through its upper part with the part of the economizer exchanger where circulates the liquid metal to be purified; and said channel for collecting the purified liquid metal;

an annular thermal insulation wall coaxial with the chambers being disposed between said first and said second chambers.

2. The purifying device as claimed in claim 1, wherein the economizer-exchanger consists of two adjacent coaxial annular chambers (14, 16) separated by a metallic shell (15) across which the heat exchanges take place, the outer chamber (14) being a chamber for reheating and discharging the purified liquid metal and communicating through its lower part with the lower part of the degassing chamber (12) and with an outlet duct (45) for the purified metal and through its upper part with the basin for collecting the purified liquid metal (44), the inner chamber (16) being a chamber for the entry and the cooling of the liquid metal to be purified, communicating through its lower part with the outlet of the pump for circulating the liquid metal to be purified (6) and through its upper part with the chamber for cooling and purifying (22) the liquid metal.

3. The purifying device as claimed in claim 1, wherein the economizer exchanger consists of tubes (60) arranged along the axial direction, inside an annular chamber (61) comprised between the internal cylindrical shell (13) of the degassing chamber (12) and the thermal insulation wall (18) joined at its upper part to the basin for collecting the purified liquid metal (44) and at its lower part to the degassing chamber (12) and to the duct for discharging the purified metal (45), inside which the purified and cooled liquid metal circulates, the tubes (60) being connected at one of their ends to the outlet of the pump for circulating the liquid metal (6) to be purified and at their other end to the annular chamber (22) for cooling and purifying the liquid metal.

4. The purifying device as claimed in claim 1 wherein the economizer exchanger consists of an assembly of double coaxial tubes (70) arranged helically inside a chamber (71) filled with thermal insulation material, comprised between the internal cylindrical shell (72) of the degassing chamber (12) and the external cylindrical shell (73) of the cooling chamber (20), the internal tube of the double coaxial tube (70) being joined at its lower part to the discharge of the pump for circulating liquid metal (6) and at its upper part to the annular chamber for cooling and purifying (22), and the outer part of the double coaxial tubes (70) communicating at its upper part with the basin for collecting the purified liquid metal (44) and at its lower part with the degassing chamber (12) and with the duct for discharging the purified liquid metal (45).

5. The purifying device as claimed in claim 2, wherein plates for stiffening and deflecting the liquid metal (55, 56) are arranged vertically inside the two adjacent coaxial annular chambers (14, 16) forming the economizer exchanger over the entire length of these chambers for stiffening of the structure and guiding the liquid metal.

6. The purifying device as claimed in claim 2, wherein the first chamber (16), the second chamber (20) and the chamber (22) containing the filter are closed at their upper part by a set of horizontal plates (37 and 38) placing the first chamber (16) in communication with the chamber (22) containing the filter and insulating the second chamber (20) from the liquid metal to be purified, openings ("a and 38 a) being provided in these plates (37 and 38) and passage shafts (39) being arranged in the region of these openings (37a and 38a) for introducing into the cooling chamber (20) devices for heat withdrawal (40) forming part of the external means for cooling this chamber.

7. The purifying device as claimed in any one of claims 2, 5 and 6 wherein the means for cooling (40) the purified liquid metal in the cooling chamber (20) consist of heat pipes which are immersed in the liquid metal filling this chamber and are connected outside the purifying device to a heat exchanger (41) of the air-cooled type.

8. The purifying device as claimed in claim 1, wherein the means for cooling the purified fluid filling the cooling chamber consist of hairpin tubes (75) which are filled with liquid sodium for exchange and are immersed with their lower part in the liquid metal filling the cooling chamber (20) and entering with their upper part into a device for cooling by air (76).

9. The purifying device as claimed in any one of claims 2, 5 and 6, wherein the various cylindrical shells of the annular chambers are all fixed at their lower part on a single base plate (10) pierced with openings (10a) for the passage of the liquid metal to be purified, a chamber for entry (30) of the liquid metal communicating with the openings (10a) in the base plate (10) being arranged under this plate (10) and communicating with the outlet of the pump for circulating the liquid metal (6).

10. The purifying device as claimed 1 in claim 1, wherein the cylindrical shells (19, 21, 23) defining the chambers for cooling (20) and for purifying (22) are joined to a first horizontal base plate (10d) and the cylindrical shells (15, 17, 11, 13) of the economizer exchanger and of the degassing chamber (12) are joined to at least one horizontal base plate (10b) which is different from the first plate (10d).

11. The purifying device as claimed in claim 10, wherein the pump (6) is arranged above the base plate (10b) supporting the cylindrical shells (15, 17, 11, 13) of the economizer exchanger and of the degassing chamber (12), all of the components of the purifying device being above this lower base plate (10b).

12. The purifying device as claimed in any one of claims 2, 5 and 6, which device is of the integrated type and is arranged inside a casing (1) filled with an inert gas.

13. The purifying device as claimed in claim 2, wherein an electromagnetic regulating pump (86) is arranged between the degassing chamber (12) and the chamber for discharge of the purified liquid metal (14) so as to propel the liquid metal in this chamber (14) up to a level above the upper end of the internal cylindrical shell (13) of the degassing chamber (12).

* * * * *